June 17, 1958 L. C. ERICKSON 2,839,651
HEATING RUBBER-COVERED CONVEYOR BELTS
Filed Jan. 14, 1954 2 Sheets-Sheet 1
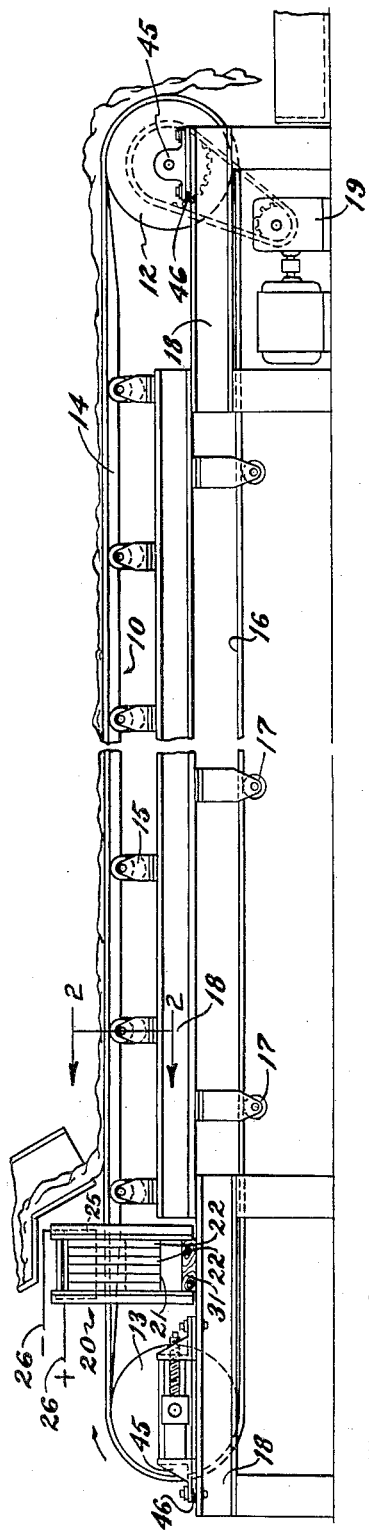
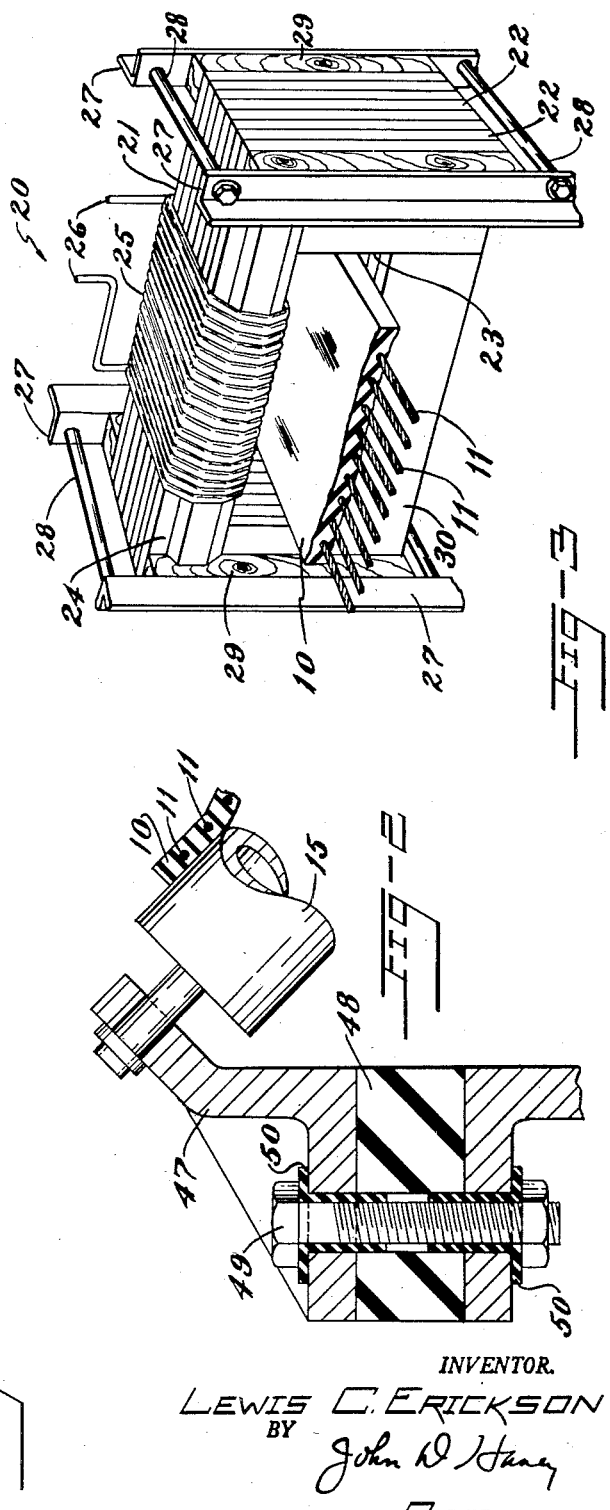
INVENTOR.
LEWIS C. ERICKSON
BY
John D. Haney
ATTY

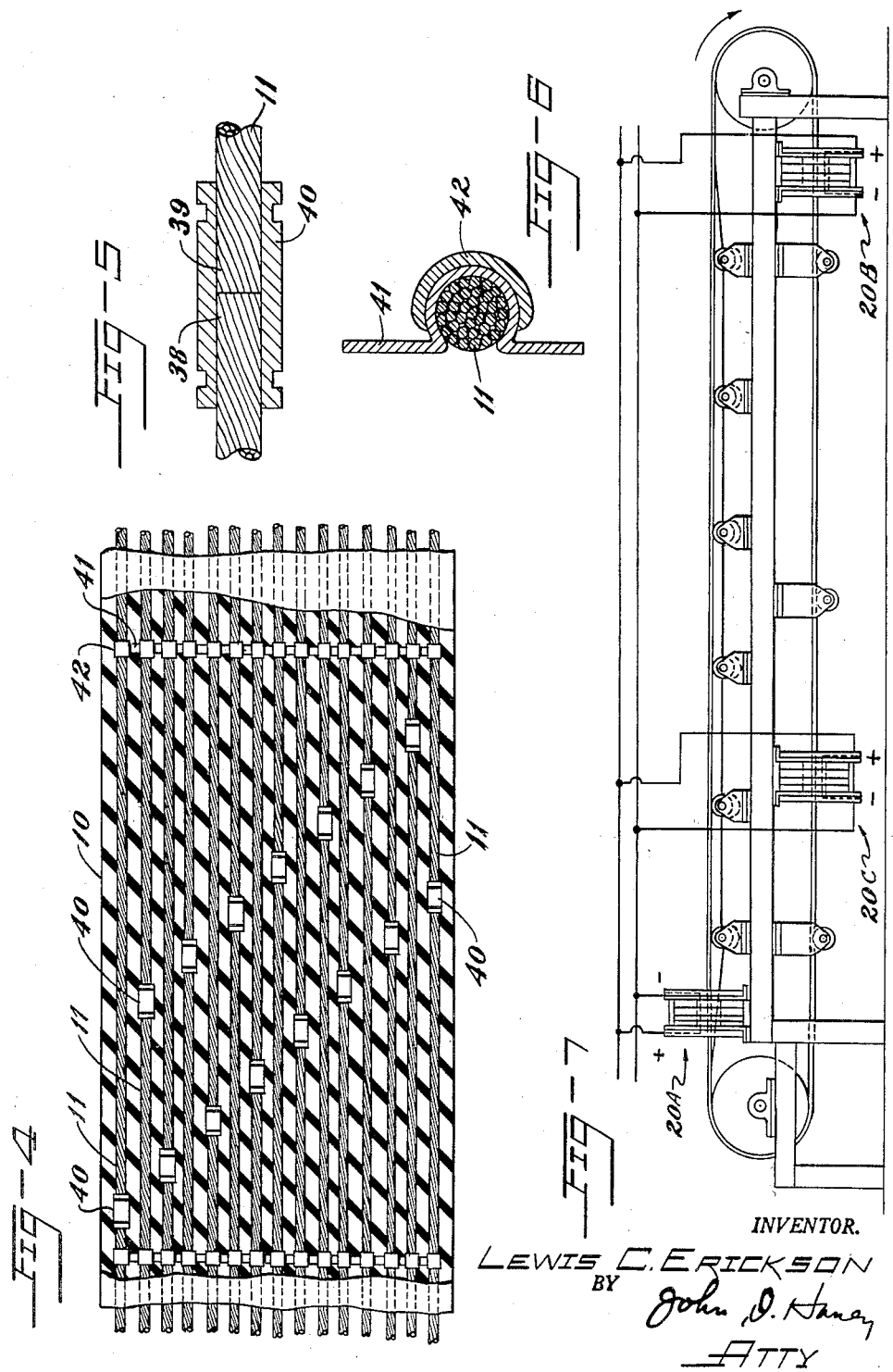

United States Patent Office 2,839,651
Patented June 17, 1958

2,839,651

HEATING RUBBER-COVERED CONVEYOR BELTS

Lewis C. Erickson, Duluth, Minn., assignor to The B. F. Goodrich Company, New York, N. Y., a corporation of New York Application January 14, 1954, Serial No. 403,949

6 Claims. (Cl. 219—10.69)

This invention relates to belt conveyor systems and particularly to heating rubber-covered conveyor belts in such systems.

Bulk materials such as ore, wood pulp, clay, and the like, are customarily conveyed by rubber-covered belts which are exposed to the weather and are required to operate throughout the year in ambient temperatures which may drop to considerably below freezing. These materials are frequently wet when they are delivered to the belts and therefore tend to stick or cling to the belts. In winter weather they become frozen to the belts and pulleys. The sticking of materials to the belts is one of the major causes which foul the operation of a conveyor system. Scrapers, brushes, and the like, have been resorted to for cleaning sticky materials from the belts but these have not been entirely satisfactory.

Additionally, in winter during temporary shut-down periods, a conveyor belt may become frozen solidly to its supporting pulleys and idlers either because of the residue of these sticky materials clinging to the belt, or because of snow and rain falling on the belt. To cope with this condition various proposals have been made which include keeping the belts running continuously even when empty and work operations not in progress; covering the belts with anti-freeze solutions; heating the belts locally by infra-red lamps; and enclosing the belts in long galleries through which heated air or other hot gases are circulated. Heated galleries have been most widely used prior to this invention, but when it is considered that a single belt may be thousands of feet long, it is apparent that all of these expedients are notoriously inefficient and expensive.

It is an object of this invention to provide a novel and improved mode of heating a rubber-covered conveyor belt under the foregoing service conditions. According to this invention, conveyor belts are provided for such service with internal metal members embedded completely within the rubber cover of the belts and the heating is accomplished by inducing electrical current into these metal members which, because of the resistance of the members, generates heat which is dissipated through the carcass of the belt. The apparatus for accomplishing this includes an electrical conductor wound in the form of a coil around a generally ring-like metal core of highly permeable material. One or more of these cores having such a coil is positioned to encircle one reach of the belt to link each coil magnetically with the belt. By introducing electrical energy in the form of an alternating current in each coil, a changing magnetic flux is induced in the core which in turn induces a flow of electrical current in the metal members of the belt which is available for heating the belt.

Rubber-covered conveyor belts having lengthwise-extending flexible metal cables are exceptionally well suited for use in connection with this invention since the individual cables of a belt when the ends of the belt are spliced together may serve as the conductors inside the belt into which the heating current is induced. Because of the high tensile strength of this type belt, they have been found particularly useful for conveying the previously-mentioned materials. At intervals along the belt, the cables are preferably interconnected with conductors which are adapted to shunt the current in one cable to the other cables if the cable should break so that arcing at the break and the possibility of burning the rubber cover is minimized.

The invention will be further described with reference to the accompanying drawings which show a preferred apparatus constructed in accordance with and having a mode of operation embodying the principles of this invention.

Fig. 1 is a side elevation of a conveyor system equipped with apparatus for heating the belt in accordance with this invention;

Fig. 2 is a view taken along the line 2—2 of Fig. 1;

Fig. 3 is a perspective view of the preferred heating unit used in the conveyor system of Fig. 1;

Fig. 4 is a fragmentary plan view of a portion of a conveyor belt reinforced with metal cables, parts of the carcass of the belt being broken away to illustrate a mode of splicing the ends of the metal cables, and interconnectors between the cables;

Fig. 5 is an enlarged lengthwise sectional view through one of the connectors for splicing the ends of one of the cables of the belt together;

Fig. 6 is a cross section through one of the cables showing an interconnector fastened to the cable; and Fig. 7 is a side elevation of a conveyor system equipped with several of the heating units provided by this invention.

In Fig. 1, a conveyor system is shown which includes an endless flexible, rubber-covered conveyor belt 10 which is longitudinally reinforced with flexible stranded metal cables 11 (see Figs. 2 and 4) and which is trained around a head driving pulley 12 and a tail idler pulley 13. The upper or the load-carrying reach 14 of the belt is supported by troughing idlers 15, and the lower or return reach 16 of the belt is supported by idlers 17, all of which are mounted intermediate to the head and tail pulleys on longitudinally-extending frame stringers 18. The belt 10 is driven lengthwise around the pulleys by the drive unit 19 engaged with the head pulley 12. The conveyor system may additionally include the usual types of belt-tensioning devices, skirt-boards, and the like, which are not illustrated but which are customarily used in such systems.

To heat the belt 10, a heating unit 20 is provided which in Fig. 1 is shown embracing the upper reach 15 of the belt between the tail pulley 13 and the point where material is loaded on the belt. The heating unit 20 includes a core 21 which is a lamination of thin flat plates 22 each of a metal having a high permeability such as transformer iron. The plates 22 may be formed and assembled in face-to-face relation into a rectangular ring-like shape in accordance with the practices of manufacturing commercial transformer cores. For example, the plates 22 may be each initially formed with two flat legs at right angles to each other and then assembled with the ends of each plate alternately butting and overlapping the ends of the adjacent plates at each corner of the core. The assembled plates 22 define a central rectangular opening 23 (see Fig. 3) through which the upper reach 15 of the belt is trained before the ends of the belt are spliced together so that the core 21 completely encircles the upper reach. The opening 23 in the core is sufficiently large so that the belt will not contact the core as it moves through the opening and thus wearing of the belt is avoided, but if the belt should contact the core, the heating effect is the same.

The portion 24 of the core which extends above the upper reach of the belt has a coil 25 wound on it consisting of a number of closely-spaced convolutions of insulated wire. As shown in Fig. 3 the convolutions of the coil 25 each extend through the central opening 23 of the core so that the coil and core are interlinked with each other. When the terminals 26 of this coil are connected with a source of alternating electrical current to energize the coil, an alternating magnetic flux is induced in the core which in turn induces an electromotive force in the cables causing current to flow in each of the cables 11 as will be more fully discussed subsequently. The coil 25 may include suitable taps (not shown) arranged with the coil so that the current flow in the coil 25 may be adjusted to regulate the temperature of the belt.

The plates 22 which form the core are clamped together by pairs of upright bars 27 at the sides of the core which are fastened together at their upper ends and lower ends by tie bolts 28. To reduce energy losses due to eddy currents, the clamping bars 27 are preferably insulated from the core by wooden members 29. The portion 30 of the core extending under the upper reach 15 of the belt is supported by a wooden base structure 31 (see Fig. 1) which insulates the core from direct contact with metal stringer 18 on which the core is supported to minimize eddy current losses.

As indicated in Fig. 4, the flexible metal cables 11 extend longitudinally through the belt and are embedded in the carcass in laterally-spaced parallel relation to each other. Other the belt is trained through the opening 23 of the core and about the various pulleys, the ends of the belt are spliced so that the opposite ends 38 and 39 (see Fig. 5) of each cable 11 are connected together to form an individual endless loop. In order to make each cable a continuous electrical conductor throughout its length, the opposite ends 38 and 39 of each cable may be joined together with a tubular metal ferrule 40. The ends of the cable fit into each end of the ferrule and thereafter the ferrule is crimped tightly against the ends. The belts are normally spliced with the ferrules 40 of adjoining cables offset from each other, as is shown in the plan view in Fig. 4, and a preferred method for splicing a cable-reinforced conveyor belt which employs metal ferrules similar to the ferrules 40 is explained in detail in United States Patent No. 2,566,262 to Eugene R. Traxler.

In conveyor installations where the belt is subjected to high operating tensions, the cables are preferably interconnected from one to the other with lateral jumpers 41 as in Figs. 4 and 6 which, if a cable should be broken, will be effective to shunt the current in the broken cable into the other cables. In this manner arcing may be avoided at the break which might injuriously burn the rubber cover. The jumpers 41 are preferably flexible flat closely-braided wire tape of high electrical conductivity and preferably extend transversely to the belt at right angles to the conductors so that as long as each cable is continuous, the jumpers will be connected to them across points of equal potential and no current will flow through them. When a break occurs in the cable (either totally or in several of the strands), the current in the broken cable will flow through the jumper adjacent the break and to the circuits formed by the unbroken cables. To secure the jumpers 41 to the cables, the tape may be laid across the cables during the construction of the belt and then fastened to embrace each cable by a C-shaped clamp 42 which is crimped over the tape and around the cables as in Fig. 6. Additionally, or in lieu of the clamps 42, the tape may be soldered to each cable. The jumpers are installed at intervals along the cables as the belt is constructed and with the cables, will be embedded wholly within the rubber cover of the belt. The jumpers are flexible to avoid impairing the ability of the belt to be troughed. The spacing between the jumpers lengthwise of the belt will depend on the operating voltage in each of the cables. Generally where the voltage is high, more jumpers are utilized at closer spaced intervals than where the voltage is low.

The operation of this heating equipment essentially resembles the operation of a transformer having as its secondary winding and load, the metal members of the belt. That is, when an alternating electrical current flows in the coil 25, a resulting alternating magnetic flux is induced in the core 21 which encircles the metal cables of the belt. If each cable is unbroken and forms a continuous electrical circuit, each cable is equivalent to a single-convolution coil encircling portion 30 of the core in series with a resistance load formed by the portions of each cable away from the core. Therefore, the changing flux in the core will induce an alternating electromotive force in each cable causing current to flow through the cable. The resistance of each cable causes this current to be dissipated into the belt carcass in the form of heat. The heat generated in the belt is numerically proportional to the product of the square of the mean effective current induced in each cable, the resistance of each cable, and the number of cables. The heating effect in the belt is the same whether the belt is stationary or whether it is being driven around the pulleys 11 and 12 and conveying a load. If the conditions are such that the jumpers 41 are carrying current, the resistance of them will also contribute to the heating effect.

In designing a conveyor system in accordance with this invention, it is desirable to avoid encircling any part of the belt with a continuous loop of metal or electrically-conductive material other than the core. Such a condition may inadvertently occur in designing the position of the idlers and the frame of a conveyor system. It is avoided in the illustrated embodiment in Fig. 1 by interposing between the bearings 45 which support the head and tail pulleys 12 and 13, respectively, and the frame stringers 18, a piece of electrically non-conductive material 46 which may be either wood, rubber, or the like. Similarly, as shown in Fig. 2, the supporting brackets 47 of the troughing idlers 15 may be insulated from the frame stringers 18 by blocks of rubber 48 or other non-conductive material and the bolts 49 which secure the brackets may be similarly insulated by rubber bushings 50. The lower idlers 17 may be also insulated from the frame members 18 in the same manner. It should be understood, however, that these insulating members need not be used if the particular parts between which they are interposed are not part of a continuous loop of metal encircling the belt. The peripheral shells of the head and tail pulleys 12 and 13 and the various supporting idlers 15 and 17 are generally cylindrical metal members, and while there may be some eddy currents induced in these shells during the operation of the equipment, this will not ordinarily be objectionable, since such currents would tend to heat the pulleys and idlers and thus contribute to the desired result.

In conveyor installations where the loads are relatively light, belts having a fabric carcass with resistance wire woven into the fabric or otherwise incorporated into the carcass may be used instead of metal cable-reinforced belts. With a belt of this type, the ends of the belt would be spliced so that the wire elements form a continuous loop throughout the length of the belt.

Each conveyor installation heated in accordance with this invention must be carefully engineered to obtain the maximum heating effect for the belts. It will be apparent to those skilled in the art that the design of the heating unit 20 will be based on such factors as the length of the belt; the total resistance of the conductor or conductors in the belt; the space required for clearance between the reaches of the belt; the permissible temperature rise of the cable; the rate of heat transfer from the conductor to the surface of the belt; and the rate of heat dissipation from the surface of the belt.

In one conveyor system which was heated in accordance with this invention and is hereby cited as an example to illustrate the power requirements here involved, an endless belt approximately 90 feet in length was trained around head and tail pulleys in a conveyor apparatus and heated by a single heating unit 20 substantially similar to that shown in Fig. 1. The belt was approximately 20" wide and contained 37 flexible steel cables, each 3/16" in diameter, which were spliced together with metal ferrules in accordance with the foregoing description and all of the cables were completely surrounded and encased in a rubber body. The coil 25 was made up of 35 turns of insulated wire. In one test which was conducted with this equipment, approximately 14,500 watts of electrical power were introduced into the coil 25. With this power input an alternating current of approximately 20 amperes was induced in each belt cable. The resistance of each cable was approximately 0.61 ohm.; and thus the total power induced in the belt available for heating amounted to approximately 8,000 watts. When the test was commenced, the ambient temperature was approximately 30° and the load-carrying reach 14 of the belt was covered with a solid coating of ice. Within 20 minutes the temperature of the belt had risen sufficiently to melt the ice and enable the belt to discharge the ice over the head pulley 12 when the conveyor belt was run. With the ambient temperature of about 70° F., the temperature of each conductor was found to be about 140° F.; the temperature of the carcass of the belt between each of the conductors was about 132° F.; and the surface temperature of the belt was 112° F.

In an installation in which the conveyor belt is appreciably long, for example in the order of 500 feet or more between the head and tail pulleys, and the desired operating temperature for the belt is such that the total power required to effect the heating is high, more than one heating unit 20 may be used at spaced-apart positions along the belt. In Fig. 7, an installation of this type is shown utilizing three heating units 20A, 20B, and 20C at spaced positions along the belt. The size of the core required in each of these units is proportionately smaller than if a single core is used. Another advantage of this type installation is that there will be a boost in the voltage in the cables at each unit, and therefore the maximum voltage drop per increment of the cables will be less than with a single heating unit for the whole belt. Thus the hazard to persons working adjacent the conveyor due to the high voltages, or to burning the belt if the cable should break, is appreciably reduced. Where several heating units are used, their respective coils are connected with a power source so that the induced currents in the cables or other reinforcing members by each unit are in the same direction.

The several heating units of Fig. 7 are each energized by single phase alternating current. In an installation where the available power is three phase, and the power required to heat the belt is high enough to produce an unbalance in the three phase system which cannot be conveniently equalized by other electrical equipment, three independent shorter conveyor belts may be used instead of a single long conveyor and each shorter belt may be individually heated by a single heating unit energized from a separated phase of the system. Alternatively, the balance of the three phase system may be obtained by utilizing it to generate single phase current.

Heating a belt in accordance with this invention is particularly efficient, since the heat is generated within the belt itself and there are no problems of transferring heat from an external source. Further, the belt may be heated uniformly throughout its length and localized heating is avoided. Belts may be operated successfully in the most severely cold weather and maintained in flexible condition. The invention is particularly useful in warm weather with belts carrying wet sticky material because the heat of the belt tends to drive any moisture in the material which comes in contact with the belt away from the belt surface preventing a bond of the material to the belt. It therefore effectively solves the problem of fouling due to wet material clinging to the belt and eliminates the necessity for scrapers, brushes, and the like, heretofore provided for this purpose. The invention is further useful for maintaining the temperature of materials while they are conveyed between various processing stations, or for heating a belt to the temperature of the materials conveyed to avoid transfer of moisture by condensation or sublimation between the belt and the materials.

Variations of the invention may be made within the scope of the appended claims.

I claim:

1. Bulk material conveyor apparatus comprising conveyor frame stringers, a head pulley and a tail pulley on said stringers, a series of belt-troughing idler rolls on said stringers intermediate said head pulley and said tail pulley, a series of transverse idler rolls on said stringers opposite said belt-troughing idler rolls, an endless flexible rubber-covered conveyor belt trained about said head pulley and said tail pulley to provide a load-carrying reach supported by said belt-troughing idlers and a return reach supported by said transverse idler rolls, said belt having transverse flexibility to conform to the troughed contour of said troughing idler rolls and said belt having a flexible dielectric rubber body and a series of laterally spaced flexible metal reinforcing members entirely encased in said rubber body and extending longitudinally through the body, the opposite ends of said reinforcing members being interconnected to include each said metal reinforcing member in a closed electrical circuit, and endless permeable metal core encircling one reach of the belt in spaced relation thereto so that the core is magnetically linked with a circuit formed by said internal reinforcing members and so that the belt is movable longitudinally relative to the core, and a coil wrapped on said core to induce magnetic flux in said core, said coil being adapted for the reception of electrical energy and through the agency of said core to induce a heating current lengthwise through said metal reinforcing members whereby said surrounding rubber body is heated by conduction from said metal reinforcing members.

2. Apparatus in accordance with claim 1 which further comprises insulating means positioned to interrupt all electrically conductive paths formed by said pulleys, idlers and stringers encircling a reach of the belt.

3. Apparatus in accordance with claim 1 wherein said internal metal reinforcing members encased in said rubber body of the belt comprise a plurality of flexible stranded steel wire cables.

4. A conveyor belt for an induction-resistance heated conveyor apparatus, the belt comprising a flat flexible dielectric rubber body, a plurality of flexible inextensible stranded wire reinforcing cables entirely encased in said body and extending lengthwise through the body in laterally spaced parallel relation to each other and adapted to carry a heating current induced therein, and flexible electrically conductive members entirely encased in said body and extending transversely to said reinforcing cables at substantially right angles to said cables at longitudinally spaced intervals along said body, said transverse members being secured in electrical conducting relation to each of said reinforcing cables for shunting heating current induced in said cables to circumvent a point of high resistance in one of said cables.

5. A conveyor belt for an induction-resistance heated conveyor apparatus, the belt comprising a flexible rubber body, a plurality of flexible metal reinforcing members wholly encased in said body and extending lengthwise through the body in laterally spaced relation to each other, and flexible electrically conductive members wholly encased in said body and extending transversely to said reinforcing members at spaced intervals lengthwise of the body, said transverse members being secured in electrical conducting relation to each of said reinforcing members for shunting heating current induced in said reinforcing members to circumvent a point of high electrical resistance in one of the members.

6. Conveyor apparatus comprising a flexible conveyor belt which includes a carcass portion having a plurality of laterally-spaced flexible metal members, means extending laterally of the belt at spaced intervals lengthwise of the belt for interconnecting said members and shunting current among said members to circumvent a point of high resistance in one of the members, and a covering of electrically non-conductive material completely surrounding said carcass and each of said members and said means, a coil of electrically-conductive wire spaced from said belt for receiving electrical energy, and a core of permeable metal linking said coil magnetically with said metal members of the belt for inducing into said metal members a proportion of the electrical energy delivered to said coil.

References Cited in the file of this patent
UNITED STATES PATENTS

| | | |
|---|---|---|
| 2,114,833 | Fincke | Apr. 19, 1938 |
| 2,301,589 | Shepard | Nov. 10, 1942 |
| 2,390,572 | Brabander | Dec. 11, 1945 |
| 2,423,902 | Peterson | July 15, 1947 |
| 2,430,024 | Luaces et al. | Nov. 4, 1947 |
| 2,463,288 | Leguillon | Mar. 1, 1949 |
| 2,593,284 | Ewell | Apr. 15, 1952 |
| 2,621,528 | Luaces et al. | Dec. 16, 1952 |